(12) United States Patent
Chien et al.

(10) Patent No.: US 7,551,008 B2
(45) Date of Patent: Jun. 23, 2009

(54) CIRCUIT FOR FIXING PEAK CURRENT OF AN INDUCTOR AND METHOD THEREOF

(75) Inventors: Mao Chuan Chien, Hsinchu (TW); Chu Yu Chu, Hsinchu (TW); Yu Min Sun, Hsinchu (TW)

(73) Assignee: Advanced Analog Technology, Inc., Hsinchu (TW)

( * ) Notice: Subject to any disclaimer, the term of this patent is extended or adjusted under 35 U.S.C. 154(b) by 148 days.

(21) Appl. No.: 11/723,302

(22) Filed: Mar. 19, 2007

(65) Prior Publication Data

US 2008/0231348 A1 Sep. 25, 2008

(30) Foreign Application Priority Data

Mar. 2, 2007 (TW) .............................. 96107113 A

(51) Int. Cl.
*H03K 3/00* (2006.01)
(52) U.S. Cl. ...................................... 327/110; 327/139
(58) Field of Classification Search ................. 327/110, 327/139
See application file for complete search history.

(56) References Cited

U.S. PATENT DOCUMENTS 5,424,666 A * 6/1995 Palara et al. ................. 327/110
5,828,245 A * 10/1998 Brambilla et al. ............ 327/108
6,982,574 B2 * 1/2006 Harriman rt al. ............. 327/108

* cited by examiner

*Primary Examiner*—Kenneth B. Wells
(74) *Attorney, Agent, or Firm*—Oliff & Berridge, PLC

(57) ABSTRACT

The circuit for fixing the peak current of an inductor includes an operating current, a ramp-type boost converter and a comparator. The magnitude of the operating current is proportional to that of the voltage source of the inductor. The ramp-type boost converter is connected to the operating current. One input end of the comparator is connected to a reference voltage, and the other end is connected to the output of the ramp-type boost converter. The output of the comparator is connected to the gate of a power transistor, which controls the turn-on time of the inductor.

13 Claims, 3 Drawing Sheets

CIRCUIT FOR FIXING PEAK CURRENT OF AN INDUCTOR AND METHOD THEREOF

BACKGROUND OF THE INVENTION

1. Field of the Invention

The present invention relates to a circuit and method for controlling current of an inductor, and more particularly, to a circuit and method for fixing peak current of an inductor.

2. Description of the Related Art

FIG. 1 is a diagram of a prior art backlight control IC. Because the peak current $I_L$ of the inductor 13 is dependent on the voltage source VIN of the power transistors 14, 15, the peak current $I_L$ is variable. The variable peak current $I_L$ connects to a CCFL 11 through a piezoelectric crystal (PZT) 12, which causes the CCFL 11 to luminesce in an unstable manner.

Because the prior art peak current of the inductor is variable, which causes numerous defects in a variety of applications, a further improvement is necessary.

SUMMARY OF THE INVENTION

The circuit and method for fixing the peak current of an inductor according to the present invention effectively erase the disadvantage of the prior art applications, which use an inconstant inductor current.

The first embodiment of the present invention comprises a voltage divider, a voltage-to-current converter, a capacitor, a comparator, a switch and a logic circuit. The voltage divider is configured to generate a low voltage that is proportional to a voltage source of the inductor. The voltage-to-current converter is connected to the voltage divider. The capacitor is connected to the output of the voltage-to-current converter. The comparator is connected to the output of the voltage-to-current converter, and the output of the comparator is connected to the gate of the power transistor. The switch has a gate and an input end connected to the input end of the comparator. The logic circuit is connected to the gate of the switch for controlling enablement of the switch.

The second embodiment of the present invention comprises an operating current, a ramp-type boost converter and a comparator. The operating current has a magnitude that is proportional to that of a voltage source of the inductor. The ramp-type boost converter is connected to the operating current. The comparator has one input end connected to a reference voltage and another input end connected to the output of the ramp-type boost converter, and the output of the comparator is connected to the gate of the power transistor.

The present invention discloses a method for fixing the peak current of an inductor comprising the following steps: (a) enabling a power transistor connected to the inductor after initialization; (b) generating a current with a magnitude that is proportional to the magnitude of a voltage source of the inductor; (c) generating a ramp-up voltage through the current; and (d) disabling the power transistor if the ramp-up voltage is greater or equal to a reference voltage.

BRIEF DESCRIPTION OF THE DRAWINGS

The invention will be described according to the appended drawings in which.

PREFERRED EMBODIMENT OF THE PRESENT INVENTION

Figure 1:
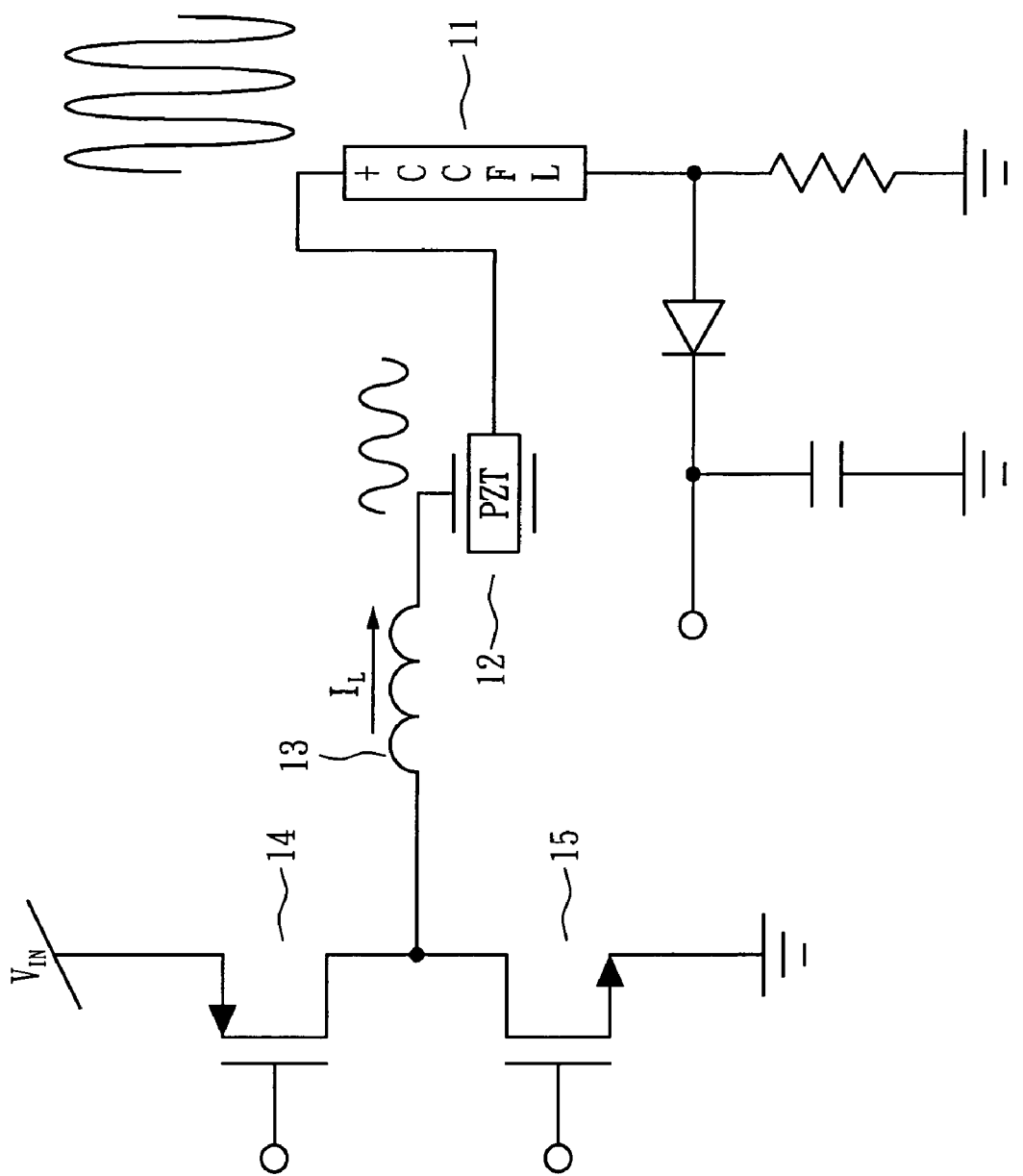
FIG. 1 is a diagram of a prior art application of the power transistor and inductor.
Figure 2:
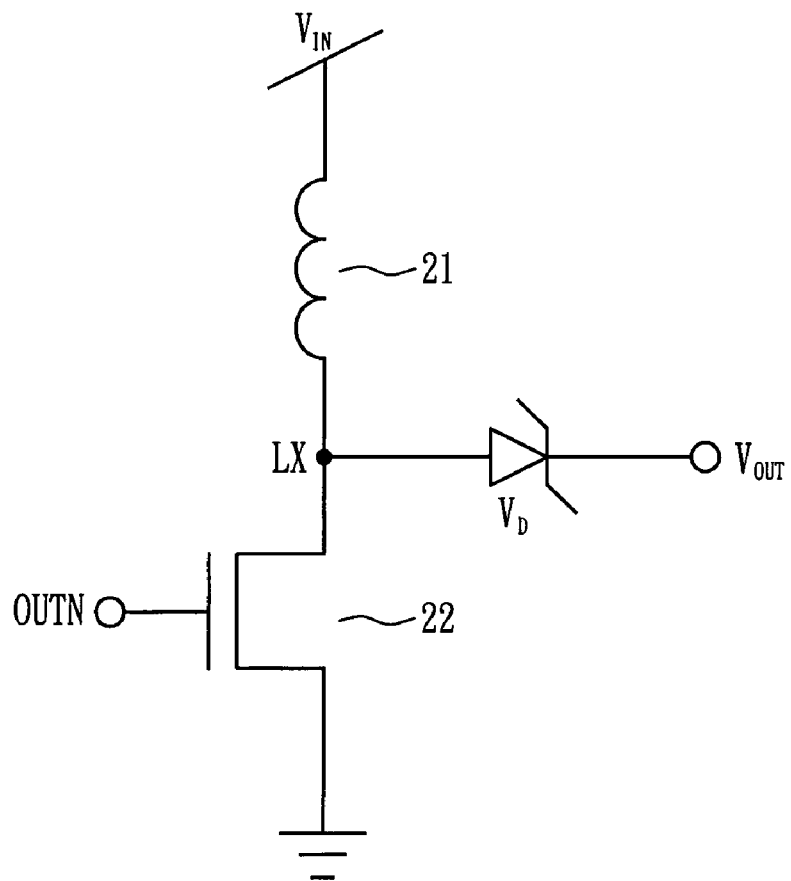
FIG. 2 is a structural diagram of the inductor and power transistor according to the present invention.

The purpose of the invention is to keep the peak current of the inductor constant. Please refer to FIG. 2: due to $$V_L = L \times \frac{dI_{PK}}{dt},$$

wherein $V_L$ represents the voltage drop of the inductor 21, L represents the inductance value, and $I_{PK}$ represents the peak current of the inductor, $$I_L = \frac{V_L \times T_{ON}}{L}$$

can be inferred, wherein $T_{ON}$ represents the turn-on time of the power transistor 22. In other words, in order to keep the peak current of the inductor constant, $V_{IN}$ has to be inversely proportional to $T_{ON}$.

Figure 3:
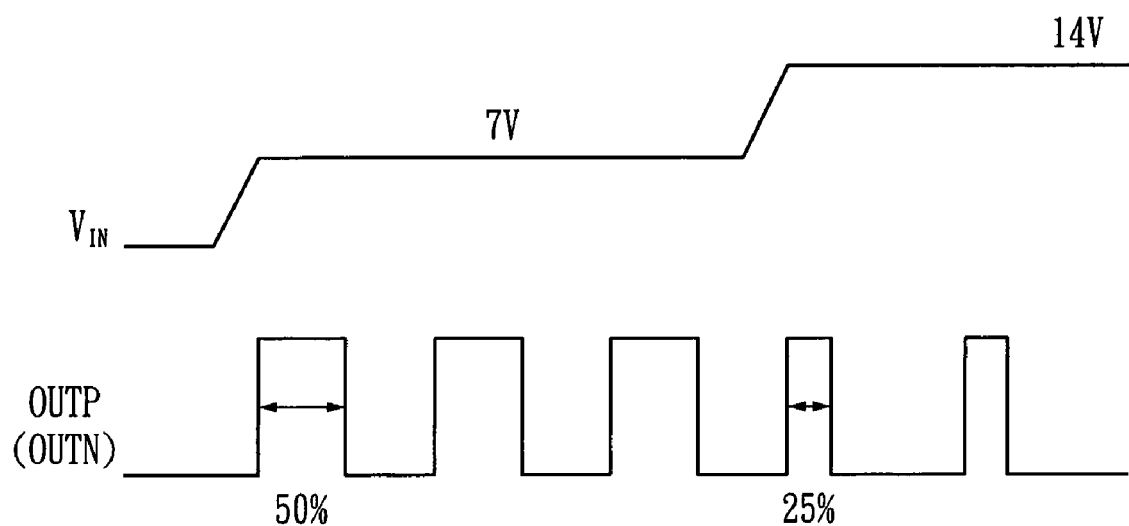
FIG. 3 shows a control method for fixing peak current according to the present invention.

FIG. 3 shows a control method for fixing peak current according to the present invention. When $V_{IN}$ is 7 volts, the duty cycle of the turn-on time $T_{ON}$ of the power transistors (no matter if they are PMOS or NMOS) is 50%. But when $V_{IN}$ is 14 volts, the duty cycle of the turn-on time $T_{ON}$ of the power transistors decreases to 25%. As such, because $V_{IN}$ is inversely proportional to $T_{ON}$, the peak current of the inductor can be kept constant.

Figure 4B:
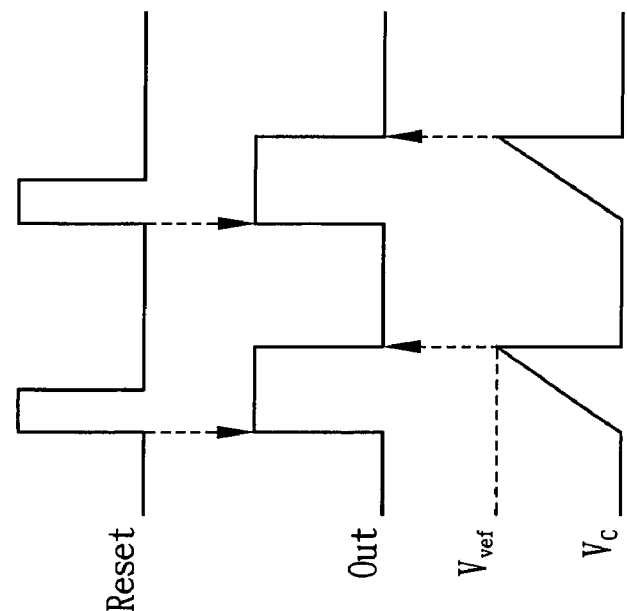
FIG. 4(b) shows a timing diagram of FIG. 4(a).
Figure 4A:
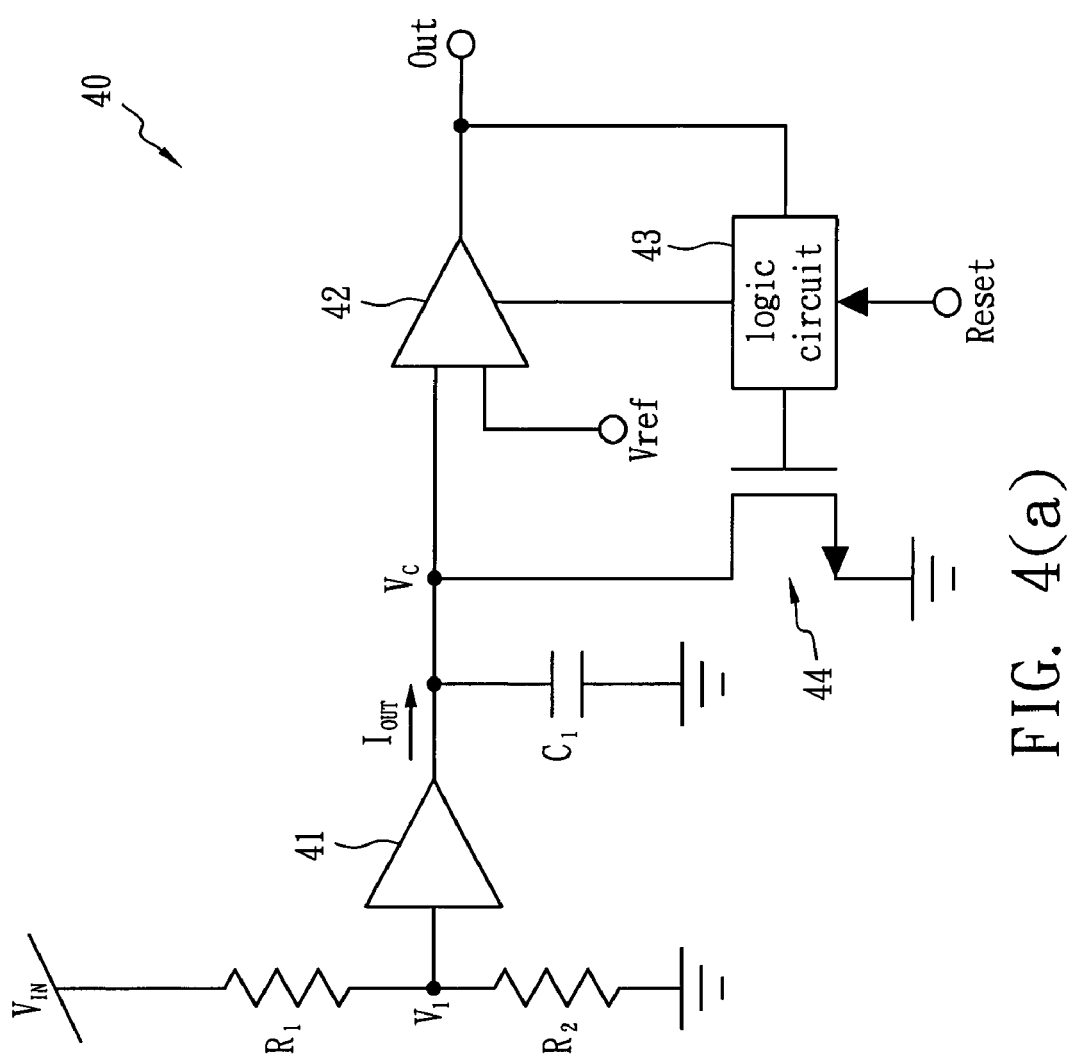
FIG. 4(a) shows a control circuit for fixing peak current of an inductor according to an embodiment of the present invention.

FIG. 4(a) shows a control circuit for fixing peak current of an inductor according to an embodiment of the present invention. A resistor voltage divider including $R_1$ and $R_2$ connects to a voltage source $V_{IN}$ used by the inductor 21, or a voltage source proportional to the $V_{IN}$. Because $V_{IN}$ is used to operate in high-voltage applications, for using low-voltage components to reduce power dissipation and chip area, the present invention uses a resistor voltage divider to reduce operating voltage $V_1$ to a relatively low voltage. An input end of the voltage-to-current converter 41 is connected to the operating voltage $V_1$ of the resistor voltage divider whose output end is connected to an input end of the comparator 42. The voltage-to-current converter 41 can use a prior art circuit for generating an operating current $I_{OUT}$ proportional to the voltage source $V_{IN}$. A capacitor $C_1$ is connected to the output of the voltage-to-current converter 41 for generating a ramp-up voltage. Due to $$I_{OUT} = C_1 \times \frac{dV_C}{dt},$$

the formula $V_C \times C_1 = I_{OUT} \times T_C$ is obtained, wherein $T_C$ represents charging time of the capacitor $C_1$. In other words, $I_{OUT}$ is inversely proportional to $T_C$. One end of the comparator 42 is connected to output voltage $V_C$ of the capacitor $C_1$, and the other input end is connected to a reference voltage $V_{ref}$. When $V_C$ is lower than $V_{ref}$, the comparator 42 outputs high voltage. Otherwise, if $V_C$ is greater than or equal to $V_{ref}$, then the comparator 42 outputs low voltage. In general design, the reference voltage. $V_{ref}$ can be set as a saturated voltage of the capacitor $C_1$, therefore $T_C$ is equal to $T_{ON}$, and the relation that $V_{IN}$ is inversely proportional to $T_{ON}$ is obtained. The output of the comparator 42 is connected to the gate of the power transistor 22 shown in FIG. 2. One end of the switch 44 is connected to the capacitor $C_1$, and the other end is grounded. The present invention does not limit any structural combination of the switch 44. When the switch 44 is enabled, a conductive path is formed to release the storage electrons of the capacitor $C_1$. A logic circuit 43 is for use in controlling the enablement of the switch 44, wherein the logic circuit 43 includes a NOR gate, and when the reset signal as well as the comparator 42 output low voltage, the switch 44 is enabled so as to discharge the storage electrons of the capacitor $C_1$. Also, after the comparator 42 outputs a low voltage, because the reset signal has entered a low voltage level, the output of the comparator 42 remains unchanged.

FIG. 4(b) shows a timing diagram of FIG. 4(a). After initialization (the transition of the reset signal from low voltage level to high voltage level), the switch 44 is disabled, and therefore the capacitor $C_1$ gradually accumulates electrons. Meanwhile, the comparator 42 outputs high voltage. When the voltage $V_C$ of the capacitor $C_1$ is greater than or equal to the reference voltage $V_{ref}$ of the comparator 42, the comparator 42 takes a transition and outputs a low voltage. Because the comparator 42 outputs the control signal to the gate of the power transistor 22 shown in FIG. 2, the power transistor 22 is disabled. By means of the inverse relationship between $V_{IN}$ and $T_{ON}$ according to the present invention, the peak current of an inductor according to the present invention can thereby be fixed.

The above-described embodiments of the present invention are intended to be illustrative only. Numerous alternative embodiments may be devised by persons skilled in the art without departing from the scope of the following claims.

What is claimed is:

1. A circuit for fixing peak current of an inductor, which is for use in controlling a gate voltage of a power transistor connected to the inductor, the circuit comprising:
    a voltage divider configured to generate a voltage that is proportional to a voltage source of the inductor;
    a voltage-to-current converter connected to the voltage divider;
    a capacitor connected to the output of the voltage-to-current converter;
    a comparator connected to the output of the voltage-to-current converter, the output of the comparator being connected to the gate of the power transistor;
    a switch having a gate and an input end connected to one input end of the comparator; and
    a logic circuit connected to the gate of the switch for controlling the switch.

2. The circuit for fixing peak current of an inductor of claim 1, wherein the voltage divider is a resistor voltage divider.

3. The circuit for fixing peak current of an inductor of claim 1, wherein the logic circuit enables the switch while a reset signal and the comparator both output a voltage.

4. The circuit for fixing peak current of an inductor of claim 1, wherein the voltage divider and the inductor share the common voltage source.

5. The circuit for fixing peak current of an inductor of claim 1, wherein the comparator remains to output a voltage after a reset signal turns to a voltage state.

6. The circuit for fixing peak current of an inductor of claim 1, wherein a reference voltage of the comparator is set to be equal to a saturated voltage of the capacitor.

7. A circuit for fixing peak current of an inductor, which is for use in controlling a gate voltage of a power transistor connected to the inductor, the circuit comprising:
    an operating current having a magnitude that is proportional to the magnitude of a voltage source of the inductor, wherein the inductor exhibits a constant peak current even the magnitude of the voltage source of the inductor is variable;
    a ramp converter connected to the operating current; and
    a comparator having one input end connected to a reference voltage and the other input end connected to the output of the ramp converter, the output of the comparator being directly connected to the gate of the power transistor.

8. The circuit for fixing peak current of an inductor of claim 7, wherein the ramp converter comprises a capacitor.

9. The circuit for fixing peak current of an inductor of claim 8, wherein a reference voltage of the comparator is set to be equal to a saturated voltage of the capacitor.

10. The circuit for fixing peak current of an inductor of claim 7, wherein the ramp converter is initialized periodically and keeps grounding before initialization.

11. A method for fixing peak current of an inductor, comprising the steps of:
    enabling a power transistor connected to the inductor after initialization;
    generating a current with a magnitude that is proportional to the magnitude of a voltage source of the inductor, wherein the inductor exhibits a constant peak current even the magnitude of the voltage source of the inductor is variable;
    generating a ramp-up voltage using the current; and
    disabling the power transistor if the ramp-up voltage is greater than or equal to a reference voltage,
    wherein the current is generated by a resistor voltage divider and a voltage-to-current converter.

12. The method for fixing peak current of an inductor of claim 11, wherein the ramp-up voltage is generated by a capacitor.

13. The method for fixing peak current of an inductor of claim 12, wherein the reference voltage is set to be equal to a saturated voltage of the capacitor.

* * * * *